(12) United States Patent
Willett et al.

(10) Patent No.: US 9,109,536 B2
(45) Date of Patent: Aug. 18, 2015

(54) ENGINE THRUST REVERSER LOCK

(71) Applicant: WOODWARD HRT, INC., Valencia, CA (US)

(72) Inventors: Kenneth Willett, Cincinnati, OH (US); John Stephen Mears, Cincinnati, OH (US); George Conway, Duarte, CA (US); Brent Michael Ozanich, Yakima, WA (US); Michael Alan Stieg, Cincinnati, OH (US); Jesus Anaya, Queretaro (MX); Joseph Thomas Kopecek, Santa Clarita, CA (US)

(73) Assignee: Woodward HRT, Inc., Valencia, CA (US)

( * ) Notice: Subject to any disclaimer, the term of this patent is extended or adjusted under 35 U.S.C. 154(b) by 259 days.

(21) Appl. No.: 13/827,192

(22) Filed: Mar. 14, 2013

(65) Prior Publication Data
US 2014/0270935 A1 Sep. 18, 2014

(51) Int. Cl.
*F02K 1/06* (2006.01)
*F02K 1/76* (2006.01)

(52) U.S. Cl.
CPC . *F02K 1/06* (2013.01); *F02K 1/766* (2013.01); *F05D 2260/56* (2013.01); *Y02T 50/671* (2013.01); *Y10T 29/49947* (2015.01); *Y10T 403/7073* (2015.01)

(58) Field of Classification Search
CPC ...... F16B 21/02; E02F 3/3609; E02F 3/3622; F02K 1/76; F02K 1/763; F02K 1/766; F05D 2260/30
See application file for complete search history.

(56) References Cited

U.S. PATENT DOCUMENTS

| | | | |
|---|---|---|---|
| 4,437,783 A | | 3/1984 | Halin et al. |
| 4,798,511 A | * | 1/1989 | Kaczmarczyk et al. ...... 414/686 |
| 5,224,342 A | | 7/1993 | Lair |
| 5,257,840 A | | 11/1993 | Rouzaud |
| 5,280,704 A | | 1/1994 | Anderson et al. |
| 5,404,714 A | | 4/1995 | Davies |
| 5,448,884 A | | 9/1995 | Repp |
| 5,547,130 A | | 8/1996 | Davies |

(Continued)

FOREIGN PATENT DOCUMENTS

| | | | | |
|---|---|---|---|---|
| EP | 0046096 | | 2/1982 | |
| FR | EP 0542611 | * | 5/1993 | ................ F02K 1/76 |
| FR | 2970521 | | 7/2012 | |

OTHER PUBLICATIONS

Authorized Officer Bruno Robelin, PCT International Search Report and Written Opinion of the International Searching Authority, PCT Application No. PCT/US2014/020557, Jul. 8, 2014, 15 pages.

*Primary Examiner* — Daniel P Stodola
*Assistant Examiner* — Jonathan Masinick
(74) *Attorney, Agent, or Firm* — Fish & Richardson P.C.

(57) ABSTRACT

In some aspects, an aircraft engine thrust reverser lock system includes a pin-capturing member. The pin-capturing member includes a body that is rotatable about an axis defined by a pivot extending through the body. The body includes an interior surface that defines a slot. The slot has an opening that is sized to receive a pin into the slot. One side of the slot includes a protruded sidewall surface that protrudes into the slot toward an another sidewall surface of the slot. The protruded sidewall surface defines an apex between the open and closed ends of the slot. Between the apex and the closed end of the slot, the protruded sidewall surface faces the rotational axis.

19 Claims, 7 Drawing Sheets

(56) References Cited

U.S. PATENT DOCUMENTS

| | | |
|---|---|---|
| 5,735,557 A | 4/1998 | Harvey |
| 5,953,904 A | 9/1999 | Mountney |
| 6,021,636 A | 2/2000 | Johnson et al. |
| 6,293,489 B1 | 9/2001 | Davies |
| 6,584,763 B2 | 7/2003 | Lymons et al. |
| 6,786,039 B2 | 9/2004 | Chakkera et al. |
| 7,409,820 B2 | 8/2008 | Ahrendt |
| 8,018,696 B2 | 9/2011 | Ahrendt |
| 2003/0159429 A1 | 8/2003 | Langston et al. |
| 2007/0273159 A1 | 11/2007 | Rouyer |
| 2010/0089191 A1 | 4/2010 | Marin Martinod |
| 2012/0172174 A1 | 7/2012 | Kopecek |
| 2014/0131515 A1 | 5/2014 | Caruel |

\* cited by examiner

ENGINE THRUST REVERSER LOCK

BACKGROUND

This specification relates to an aircraft engine thrust reverser lock.

An engine thrust reverser assists in the deceleration of an aircraft, for example during aircraft landing. When the engine thrust reverser is deployed, a portion of the engine exhaust gases or engine fan air is redirected to provide a force that counteracts the forward motion of the aircraft. For example, the air may be redirected in the forward direction. The engine thrust reverser can include moveable doors, vanes, vents or similar assemblages in the transcowl surrounding the engine.

Aircraft engine thrust reverser systems typically include multiple locking mechanisms to prevent accidental deployment. In addition to a primary lock mechanism, secondary and tertiary locks can be used as redundant safety features. For example, if the primary lock fails, the secondary or tertiary locks can prevent deployment.

SUMMARY

In a general aspect, an aircraft engine thrust reverser can be locked, for example, to prevent accidental deployment.

In some aspects, an aircraft engine thrust reverser lock includes a pin-capturing member. The pin-capturing member includes a body that is rotatable about an axis defined by a pivot extending through the body. The body includes an interior surface that defines a slot, including first and second fixed, opposing slot sides between an open end of the slot and a closed end of the slot. An opening between the first and second slot sides at the open end of the slot is sized to receive a pin into the slot. The first slot side includes an end wall surface that extends from the open end of the slot and faces the rotational axis. The first slot side includes a first sidewall surface that extends from the end wall surface toward the closed end of the slot. The second slot side includes a protruded sidewall surface that protrudes into the slot toward the first sidewall surface. The protruded sidewall surface defines an apex between the open and closed ends of the slot. The protruded sidewall surface faces the end wall between the apex and the open end of the slot, and the protruded sidewall surface faces the rotational axis between the apex and the closed end of the slot.

Implementations of these and other aspects may include one or more of the following features. The end wall surface is a first end wall surface. The interior surface includes a second end wall surface at the closed end of the slot between the first and second slot sides. The first and second end wall surfaces face each other and define the depth of the slot. The first end wall surface extends from the opening and meets the first sidewall surface. The first sidewall surface extends from the first end wall surface and meets the second end wall surface. The second end wall surface extends from the first sidewall surface and meets the protruded sidewall surface. The protruded sidewall surface extends from the second end wall surface to the opening. One side of the protruded sidewall surface faces the rotational axis and the other side faces away from the rotational axis. The sides of the protruded sidewall define an acute angle with respect to the apex. The protruded sidewall surface defines a radius at the apex.

Additionally or alternatively, implementations of these and other aspects may include one or more of the following features. The pin-capturing member includes a mass balance member that extends from the body on an opposite side of the rotational axis. The body includes an outer exterior surface that extends from the first slot side and defines a radiused end of the body. The exterior surface extends from the radiused end to a protrusion that protrudes from the body to engage an actuator member. The aircraft engine thrust reverser lock also includes a spring that contacts the pin-capturing member body to bias the body in a first direction of rotation about the rotational axis.

In some aspects, an aircraft engine thrust reverser locking system includes a pin-capturing member and a pin secured to a thrust reverser door assembly. The pin is moveable between a captured position and a released position. The pin-capturing member is rotatable about a pivot between an up position and a down position. The interior surface of the pin-capturing member defines a slot that surrounds the pin in the captured position. The interior surface includes first and second fixed, opposing slot sides that extend between an open end of the slot and a closed end of the slot. The first side of the slot includes an end wall that faces the pivot and prevents the pin from moving to the released position from inside the slot when the pin-capturing member is in the down position. The second side of the slot includes a protruded surface that defines an apex between the open and closed ends of the slot. The protruded surface faces the pivot between the apex and the closed end of the slot, and the protruded surface faces away from the pivot between the apex and the open end of the slot.

Implementations of these and other aspects may include one or more of the following features. The aircraft engine thrust reverser locking system includes an actuator. The actuator is movable between a locked and an unlocked position. The actuator in the locked position contacts the pin-capturing member to maintain the pin-capturing member in the down position. The actuator includes a sensor plate that extends from the body. One or more proximity sensors is configured to detect the position of the sensor plate. The captured position of the pin corresponds to a stowed configuration of the thrust reverser door assembly, and the released position of the pin corresponds to a deployed configuration of the thrust reverser door assembly.

Additionally or alternatively, implementations of these and other aspects may include one or more of the following features. A biasing member rotates the pin-capturing member from the down position toward the up position when the actuator is in the unlocked position. The biasing member can be a torsion spring around the pivot. A blocking member limits the extent of rotation of the pin-capturing member.

In some aspects, a pin-capturing member is maintained in an up position. The pin-capturing member is rotatable about a rotational axis between the up position and a down position. The pin-capturing member includes an inner surface that defines first and second fixed, opposing slot sides that extend between open and closed ends of a slot within the pin-capturing member. The inner surface includes a follower surface extending from the open end toward the closed end. The pin is translated in a first direction with respect to the rotational axis from an exterior of the pin-capturing member through the open end of the slot and into contact with the follower surface. The pin-capturing member is rotated from the up position to the down position by translating the pin in the first direction while contacting the follower surface. The pin is disengaged from the inner surface by translating the pin within the slot in the first direction, toward the closed end of the slot.

Implementations of these and other aspects may include one or more of the following features. The pin-capturing member is prevented form rotating back to the up position after the pin is disengaged from the inner surface. The pin-capturing member is biased toward the up position, and prevented from rotating back to the up position after the pin is disengaged. The pin is disengaged from the pin-capturing member without moving the pin opposite the first direction.

In some aspects, an aircraft engine thrust reverser lock includes a body having an outer boundary and an inner surface defining a slot. The slot has an entry through the outer boundary, a closed end, and a clearance space. The slot is of fixed dimension. The inner surface of the body includes a protrusion with two oppositely sloped sides joined at an apex. One of the sloped sides faces toward the entry such that a pin that moves into the slot through the entry rides along the sloped side facing the entry, over the apex, and into the clearance space without contacting the other of the sloped sides. The body is secured to a pivot for rotational coupling of the body to a support structure.

The details of one or more embodiments of these concepts are set forth in the accompanying drawings and the description below. Other features, objects, and advantages of these concepts will be apparent from the description and drawings, and from the claims.

DESCRIPTION OF THE DRAWINGS

Like reference symbols in the various drawings indicate like elements.

DETAILED DESCRIPTION

Figure 1:
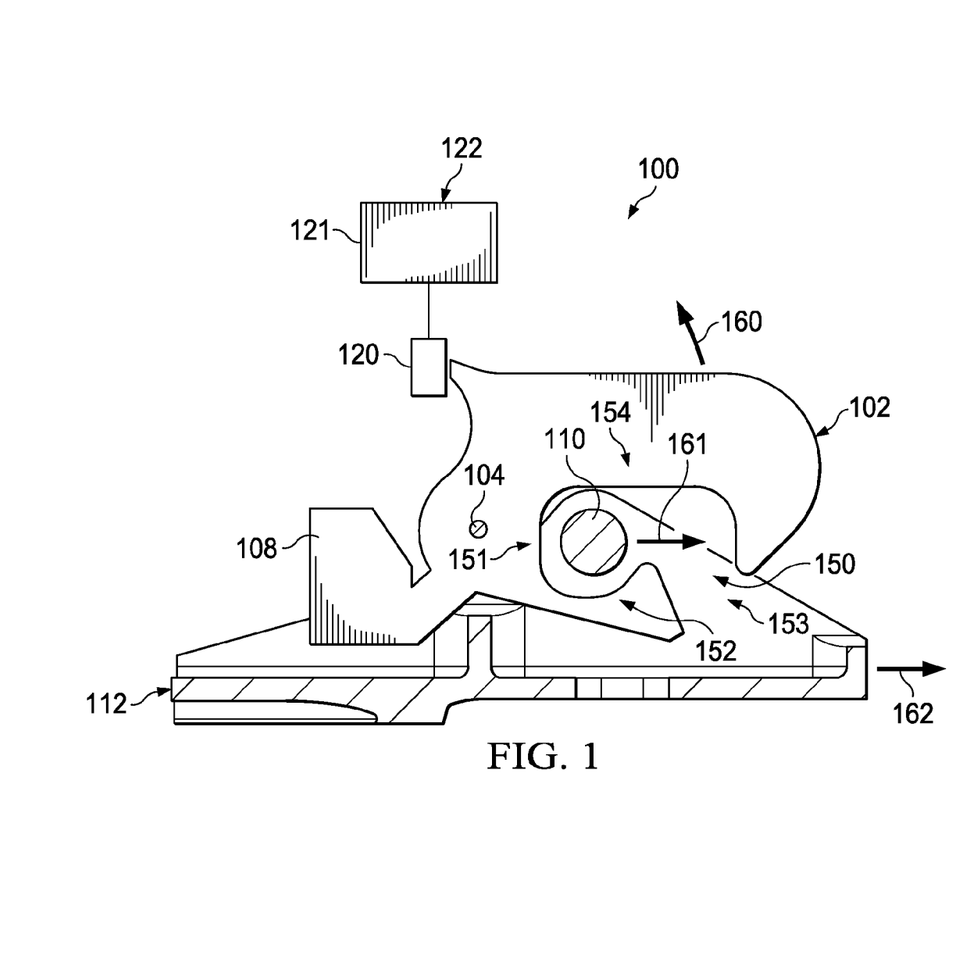
FIG. 1 is a schematic diagram showing a cross-section of an example thrust reverser lock assembly.

FIG. 1 shows a cross-sectional view of an example aircraft engine thrust reverser lock assembly 100 in the locked configuration. The example lock assembly 100 can prevent inadvertent deployment of an aircraft engine thrust reverser by maintaining a pin 110 in a captured position within a pin-capturing member 102. In the example shown in FIG. 1, the pin 110 is attached to a transcowl 112 of an aircraft engine thrust reverser system, and the transcowl 112 is shown in the stowed configuration. When the aircraft engine's thrust reverser is deployed, the lock assembly 100 releases the pin 110, allowing the transcowl 112 to move from the stowed position to a deployed position (in the direction shown by arrow 162 in FIG. 1). The example lock assembly 100 can be used in a cascade-type thrust reverser, a pin-in-door type thrust reverser, or another type of thrust reverser.

The example lock assembly 100 shown in FIG. 1 includes the pin-capturing member 102 and an actuating system 122. A lock assembly can include additional or different features, and the components of a lock assembly can be arranged as shown in FIG. 1, or they may be arranged in another manner. In the example shown, the lock assembly 100 locks the aircraft engine thrust reverser by securing the transcowl 112 against movement to a deployed position. The lock assembly 100 can be modified or adapted to secure additional or different components of an aircraft engine thrust reverser to prevent inadvertent deployment.

The example lock assembly 100 shown in FIG. 1 is configured to operate as back-up (e.g., secondary, tertiary, etc.) locking mechanism that can prevent inadvertent deployment of the thrust reverser system upon failure of a primary locking system. As such, the example lock assembly 100 ordinarily need not contact the pin 110 or other components of the transcowl 112 when the thrust reverser is maintained in the stowed configuration. If the primary locking system fails, the lock assembly 100 can then contact the pin 110 to maintain the thrust reverser in the stowed configuration.

In some implementations, avoiding contact between the transcowl 112 and the lock assembly 100 can reduce wear on components and extend their operational life. In some cases, the lock assembly 100 substantially contacts the pin 110 only during movement of the transcowl 112 between the deployed and stowed configurations (as shown, for example, in FIGS. 2A-2F) or upon failure of a primary locking system. As such, the example pin 110 does not ordinarily contact or bear against the pin-capturing member 102 while the thrust reverser is held in the stowed position. In some instances (e.g., due to aircraft turbulence, etc.), the lock assembly 100 makes incidental or insubstantial contact with the pin 110 while the transcowl 112 is held in the stowed configuration.

As shown in FIG. 1, there is clearance space between the interior surface of the pin-capturing member 102 and the circumference of the pin 110 when the pin 110 is in the captured position within the pin-capturing member 102. During a locking process, the pin 110 can reach the captured position with circumferential clearance (as shown in FIG. 1) without the use of over-stow. For example, the pin 110 can move in a single direction from the released position outside the pin-capturing member 102 to the captured position inside the pin-capturing member 102, and without changing its direction of movement, the pin 110 can come to rest clear of the pin-capturing member 102 on all sides. In the example shown in FIG. 1, the pin 110 can reach the captured position from the released position by moving generally toward the pivot 104 (opposite the direction shown by arrow 161 in FIG. 1) without reversing its direction.

Some conventional aircraft engine thrust reverser systems use an over-stow process, where a transcowl moves beyond the stowed position and then returns to the stowed position, for example, to achieve clearance. Over-stow systems typically require additional seals, additional mechanical parts, and other features that can add weight and cost to the aircraft. The lock assembly 100 can be implemented in a system that does not include over-stow, which may provide reduced costs, reduced weight, reduced wear, and potentially other advantages in some cases. Or in some implementations, the lock assembly 100 can be used in a system with over-stow.

The example pin-capturing member 102 can rotate on a pivot 104 between a down position and an up position. FIG. 1 shows the pin-capturing member 102 in the down position; the pin-capturing member 102 can move to the up position by rotating on the pivot 104 in the clockwise direction (shown by arrow 160 in FIG. 1). The pin-capturing member 102 includes an interior surface that defines a slot 150. The open end 153 of the slot 150 is sized to allow the pin 110 to pass from the captured position inside the slot 150 to the released position outside the slot 150. The example pin 110 can be an elongate rod, a roller, or another type of structure secured to the transcowl 112 or another component of the engine thrust reverser system.

The example slot 150 shown in FIG. 1 has fixed dimensions. It has an open end 153, a closed end 151, and two opposing sides 152, 154 between the open end 153 and the closed end 151. As shown in FIG. 1, the lower side 152 of the slot 150 has a protruded portion that protrudes into the slot 150 toward the upper side 154; the upper side 154 has a hooked portion that faces the pivot 104. A slot can have another shape, which may include the features shown or different features.

When the pin-capturing member 102 is in the down position and the pin is in the captured position (as shown in FIG. 1), the pin 110 can be kept out of contact with the inner surface that defines the slot 150 during normal operation, thus reducing potential wear or fretting. Movement of the transcowl 112 toward the deployed position (e.g., upon failure of a primary lock, etc.) causes the pin 110 to move in the direction shown by the arrow 161 in FIG. 1. The hooked end of the slot 150 can contact the pin 110 to prevent the pin 110 from exiting the slot 150 to the released position, which prevents the transcowl 112 from reaching the deployed configuration.

When the pin-capturing member 102 is in the up position, the pin 110 can be moved from the released position (outside the slot 150) to the captured position (inside the slot 150) without the use of over-stow. The pin 110 can translate in a single direction from outside the slot 150 through the open end 153 and continue movement in the same direction (generally toward the pivot 104, opposite the direction shown by the arrow 161) to the captured position. In particular, while moving in a single direction toward the pivot 104, the pin 110 rides up the sloped surface to the apex of the protrusion on the lower side 152, and the pin 110 releases from the lower side 152 to a captured position inside the slot 150, out of contact with the pin-capturing member 102.

In some implementations, because of the shape of the protrusion on the lower side 152, the pin 110 does not need to reverse motion to come out of contact with the pin-capturing member 102 within the slot 150. For example, the protrusion surface between the apex and the closed end 151 of the slot 150 faces toward the pivot 104, which allows the pin 110 to release from the lower side 152 as the pin 110 moves toward the pivot 104.

The pin-capturing member 102 includes a mass balance 108 that extends from the pivot 104 opposite the main body of the pin-capturing member 102. The mass balance 108 can be sized and dimensioned to balance the pin-capturing member 102 on the pivot 104. The mass balance 108 can reduce the tendency of the pin-capturing member 102 to rotate about the pivot 104. For example, the mass balance 108 can act as a damper against movement of the pin-capturing member 102 in response to aircraft vibrations and other external forces acting on the lock assembly 100. In some cases, the example mass balance 108 can assist rotating the pin-capturing member 102 from the down position toward the up position (e.g., when the actuator member 120 has been translated out of contact with the pin-capturing member 102). Additionally or alternatively, the reverser lock assembly 100 can include a biasing member (e.g., a spring) that biases the pin-capturing member 102 toward the up position, assists rotating the pin-capturing member 102 from the down position toward the up position, or both.

The example actuating system 122 includes a mover 121 and an actuator member 120. The mover 121 can be a plunger of a solenoid assembly or another type of device that moves in response to a command signal received by the actuating system 122. The actuator member 120 can have a body that is mechanically coupled to the mover 121. The mover 121 can move the actuator member 120 between a locked position (shown in FIG. 1) and an unlocked position.

As shown in FIG. 1, the example pin-capturing member 102 can be maintained in the down position by contact with the actuator member 120. In the locked position, the actuator member 120 prevents the pin-capturing member 102 from rotating from the down position to the up position. Upon receiving a command signal, the actuating system 122 can translate, rotate, or otherwise move the actuator member 120 from the locked position to the unlocked position, thus allowing the pin-capturing member 102 to rotate from the down position toward the up position (in the direction shown by arrow 160 in FIG. 1).

Figure 2A:
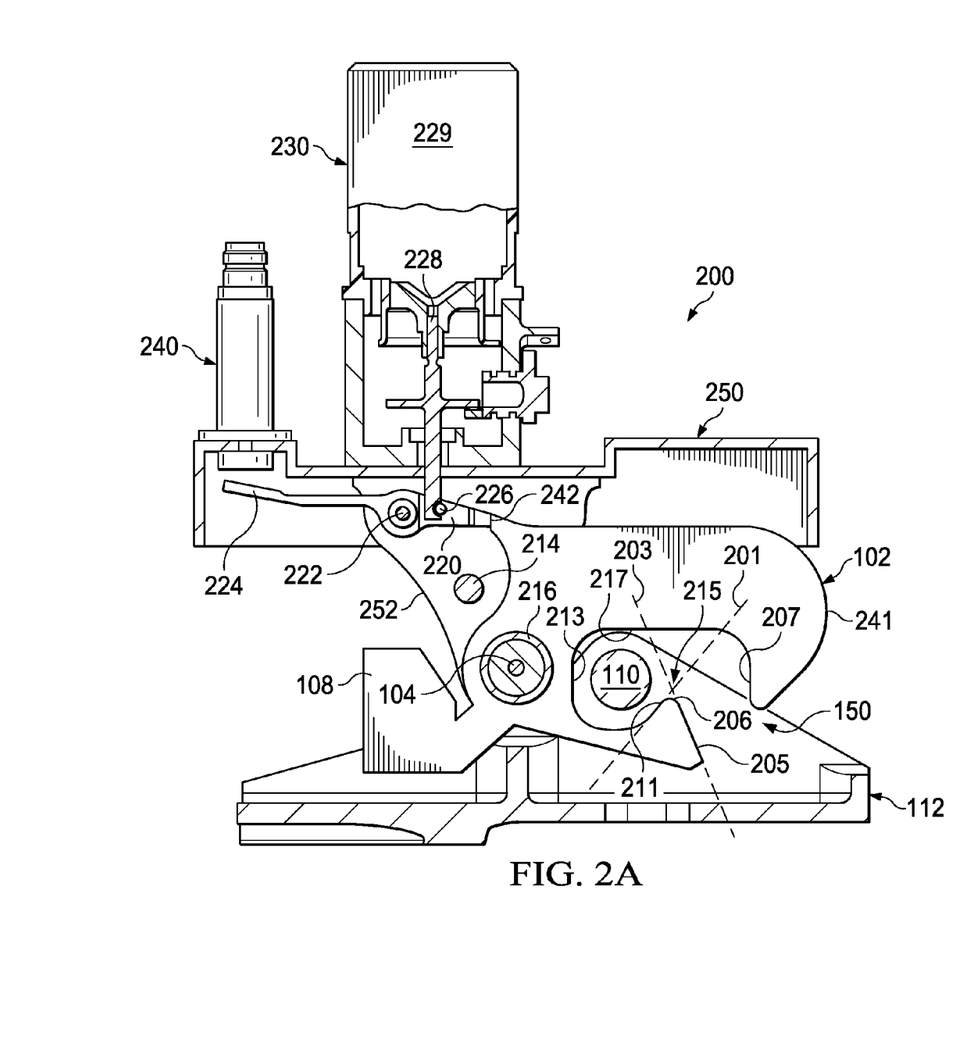
FIG. 2A is a schematic diagram showing a cross-section of an example thrust reverser lock assembly 200 in the locked configuration.
Figure 2B:
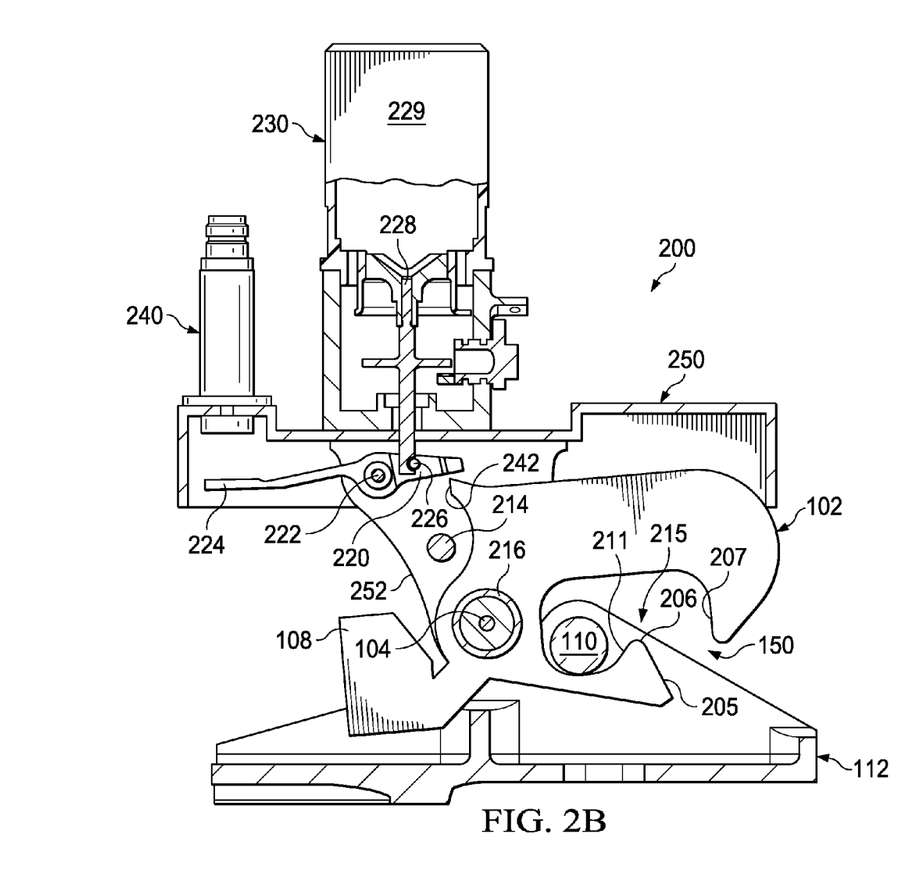
FIG. 2B is a schematic diagram showing a cross-section of the example thrust reverser lock assembly 200 of FIG. 2A in an unlocked configuration.
Figure 2C:
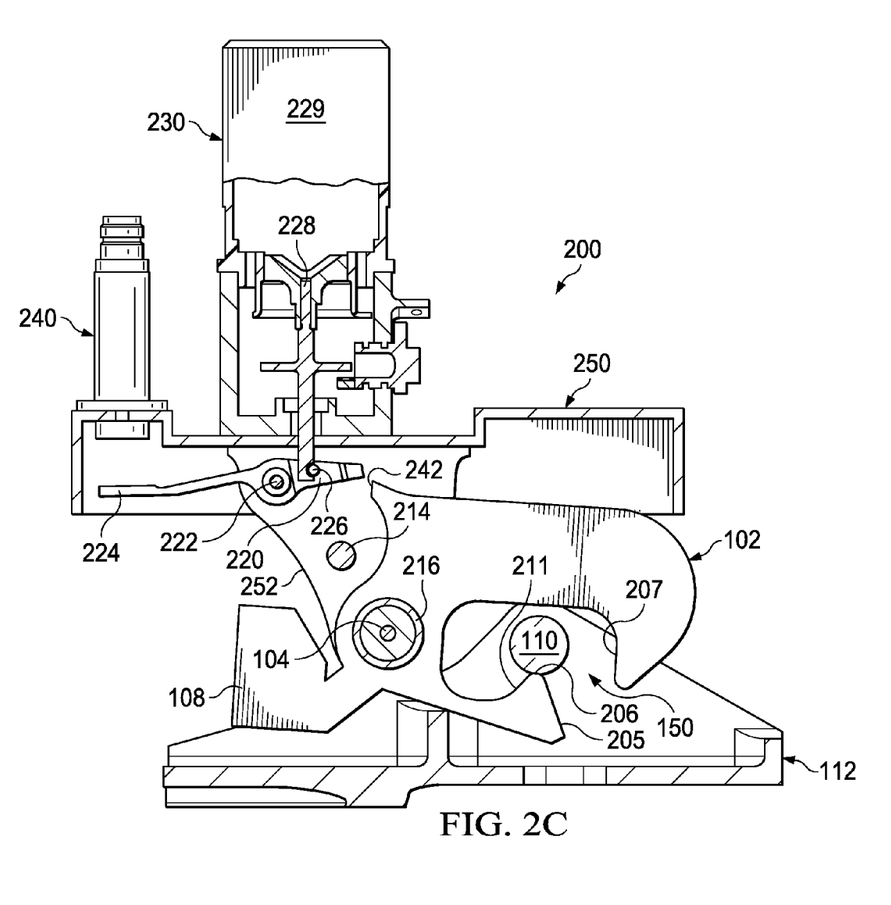
FIG. 2C is a schematic diagram showing a cross-section of the example thrust reverser lock assembly 200 of FIG. 2A in the unlocked configuration as the pin 110 exits the pin-capturing member 102.
Figure 2D:
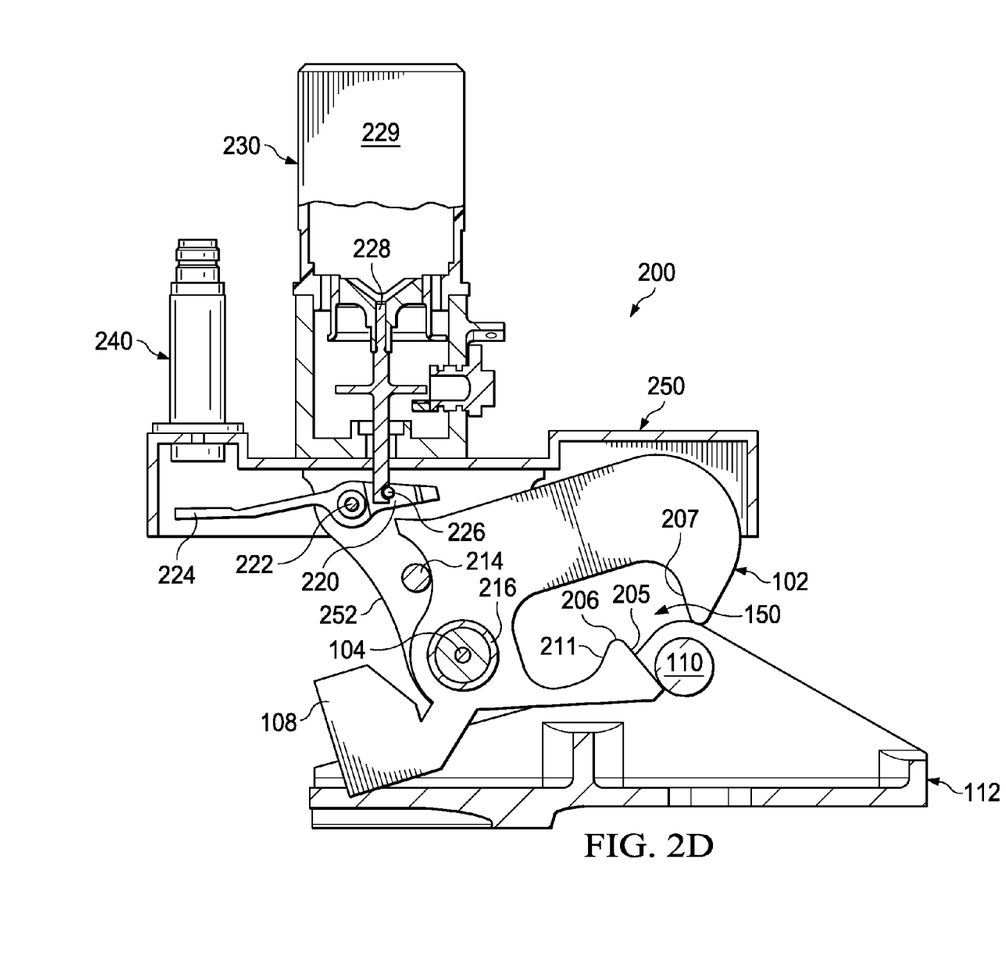
FIG. 2D is a schematic diagram showing a cross-section of the example thrust reverser lock assembly 200 of FIG. 2A in the unlocked configuration as the pin 110 continues exiting the pin-capturing member 102.

With the actuator member 120 in the unlocked position, the lock assembly 100 can release the pin 110 as the transcowl 112 moves in the direction shown by arrow 162 in FIG. 1, to deploy the engine thrust reverser. FIGS. 2B, 2C, and 2D show an example lock assembly 200 at multiple stages during the pin release process. When the actuator member 120 is initially moved to the unlocked position (e.g., from the locked position shown in FIG. 1), the pin-capturing member 102 rotates toward the up position until the pin 110 contacts the lower side 152 of the slot 150. As the transcowl 112 moves to deploy the engine thrust reverser, the pin 110 translates toward the open end 153 of the slot 150. Because the pin-capturing member 102 is biased toward the up position, the pin 110 rides along the lower side 152 of the slot 150 toward the open end 153. Translating the pin 110 through the open end 153 of the slot 150 releases the pin 110 from the inner surface of the pin-capturing member 102, and the pin-capturing member 102 rotates (counterclockwise in FIG. 1) to the up position, for example, until it contacts a stop.

Figure 2E:
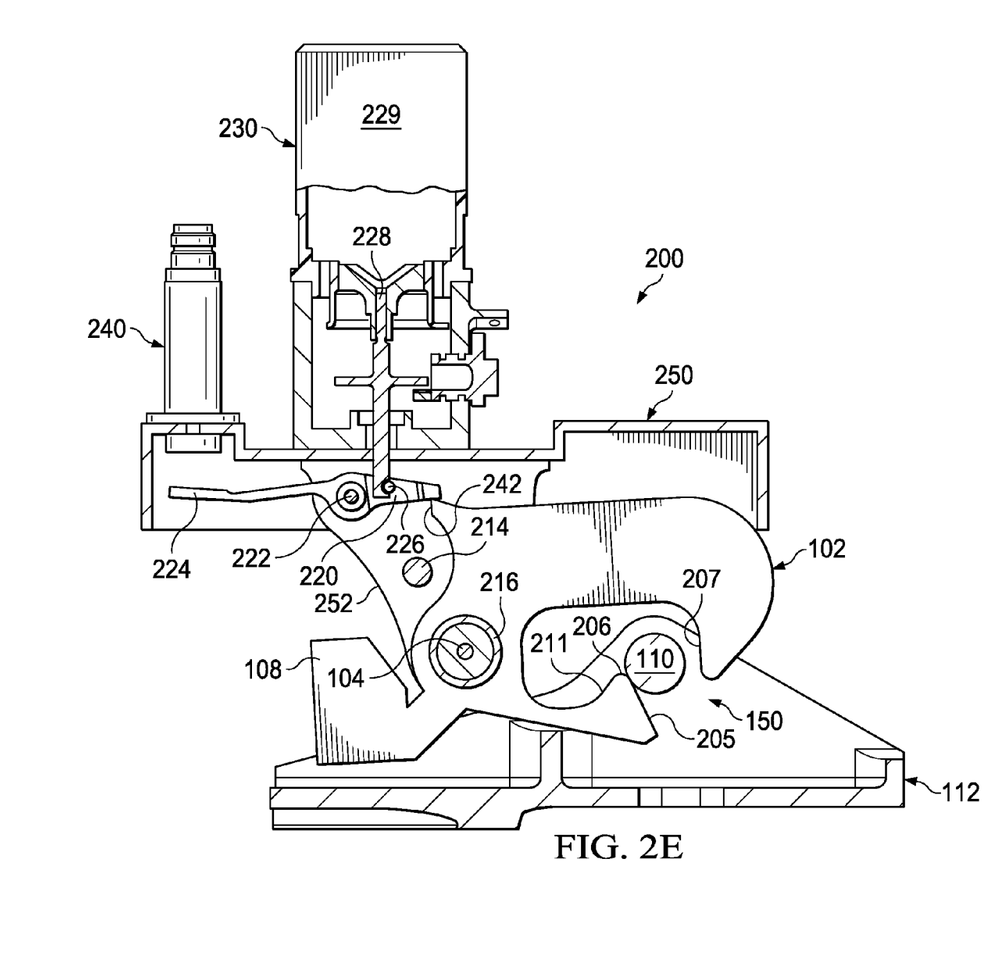
FIG. 2E is a schematic diagram showing a cross-section of the example thrust reverser lock assembly 200 of FIG. 2A in the unlocked configuration as the pin 110 enters the pin-capturing member 102.
Figure 2F:
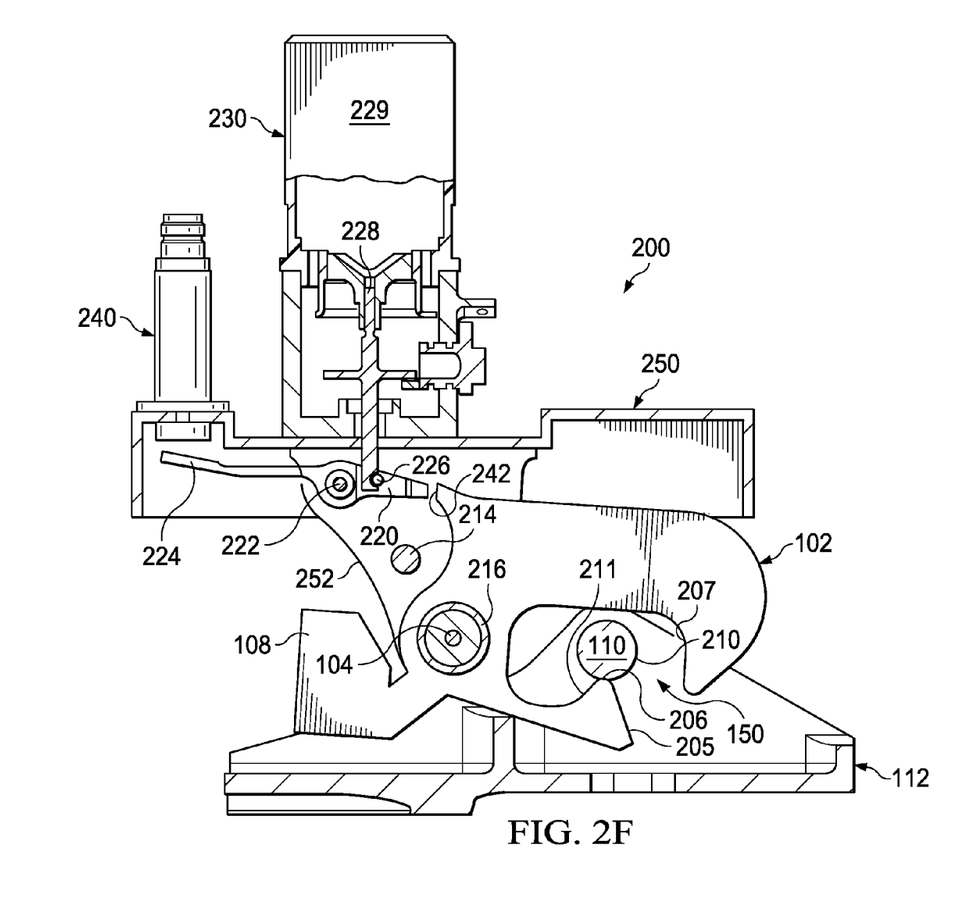
FIG. 2F is a schematic diagram showing a cross-section of the example thrust reverser lock assembly 200 of FIG. 2A in a locked configuration as the pin 110 continues entering the pin-capturing member 102.

The lock assembly 100 can recapture the pin 110 when the transcowl 112 is moved from the deployed position to the stowed position. FIGS. 2E, 2F, and 2A show the example lock assembly 200 at multiple stages during the pin capture process. With the pin-capturing member 102 in the up position, the pin 110 can translate into the slot 150 through the open end 153. As it translates from the open end 153 toward the closed end 151, the pin 110 bears on the lower side 152 of the slot 150 and rotates the pin-capturing member 102 toward the down position. Rotation of the pin-capturing member 102 allows the actuator member 120 to move into the locked position, which prevents the pin-capturing member 102 from moving back to the up position. After the pin 110 passes over the apex of the protrusion on the lower side 152 of the slot 150, the pin 110 releases from the lower side 152 into the captured position shown in FIG. 1. A spring or another type of biasing member can bias the pin-capturing member 102 against the actuator member 120 in the locked position. The lock assembly 100 can come to rest with clearance between pin-capturing member 102 and the pin 110 on all sides.

FIGS. 2A-2F show cross-sectional views of an example aircraft engine thrust reverser lock assembly 200. The lock assembly 200 can operate substantially as the example lock assembly 100 shown in FIG. 1. The example lock assembly 200 can include other features, or it may operate in another manner. In the example lock assembly 200, a housing 250 supports one or more flanges 252, an actuation system 230, and proximity sensors 240.

In the example shown, the example pivot 104 is secured to the flanges 252, which are arranged on one or more sides of the pin-capturing member 102, and the pivot 104 supports the pin-capturing member 102. A torsion spring 216 encircles the pivot 104 and contacts the pin-capturing member 102, tending to rotate the pin-capturing member 102 toward the up position. A torsion spring, a linear spring, or another type of biasing member or apparatus can be used to impart a rotational bias on the pin-capturing member 102. From the perspective shown in FIGS. 2A-2F, the torsion spring 216 biases the pin-capturing member 102 toward the counterclockwise direction. For example, the torsion spring 216 can rotate the pin-capturing member 102 to contact the actuator member 220 (e.g., as in FIG. 2A), the pin 110 (e.g., as in FIGS. 2B-2F), or the blocking member 214 (e.g., as in FIG. 2F). The mass balance 108 may act as a counterweight on the opposite side of the pivot 104 from the slot 150.

In some implementations, the pin-capturing member 102, the pivot 104, the actuator member 220, the pin 110, and other components are made of stainless steel or another type of alloy. The various components that contact each other during operation can be made of stainless steel materials having different heat treatments. For example, the pin-capturing member 102 and the pin 110 may be made of stainless steels that have different heat treatments. In some implementations, the pin-capturing member 102 can be made of 15-5 PH stainless steel, which is an example of a precipitation hardening stainless steel. Other types of stainless steel materials may be used. In some implementations, the pin-capturing member 102 can be made of aluminum, for example, for smaller engine systems, smaller inadvertent loads, or in other contexts. Other materials may be used.

The lock assembly 200 can include a bushing between the pin-capturing member 102 and the pivot 104. The bushing can act as a bearing to reduce friction and allow rotation of the pin-capturing member 102 about the pivot 104. The bushing can be made of a bronze material, such as, for example, aluminum nickel bronze, or another type of material.

The pin-capturing member 102 includes an outer surface 241 that defines an outer boundary of the pin-capturing member 102. The outer surface 241 defines a protruded contact surface 242 that can contact the actuator member 220 when the actuator member 220 is in the locked position. Contact between the contact surface 242 and the actuator member 220 in the locked position can maintain the pin-capturing member 102 in the down position shown in FIG. 2A. The blocking member 214 extends in a fixed location from the flanges 252 and blocks the pin-capturing member 102 from rotating beyond a certain angle (e.g., as shown in FIG. 2D). The blocking member 214 can be positioned to contact the outer surface 241 of the pin-capturing member 102 when the pin-capturing member 102 rotates to the up position, for example, during the locking or unlocking process.

The example lock assembly 200 includes an actuation system 230 to move the actuator member 220 between the locked and unlocked positions. The actuation system 230 includes a solenoid assembly 229, a plunger 228, and the actuator member 220. The plunger 228 is operably connected to the solenoid assembly 229 to move in response to a signal (e.g., a voltage signal) applied to the solenoid assembly 229. The plunger 228 is mechanically connected to the actuator member 220 at a pivot 226. The plunger 228 can exert a force on the actuator member 220 at the pivot 226 to move the actuator member 220 between the locked and unlocked positions. The actuator member 220 can rotate about another pivot 222 connected to the flanges 252. The flanges 252 support the pivot 222 at a fixed location with respect to the pivot 104, for example, to mechanically support the actuator member 220 against movement when the pin-capturing member 102 contacts the actuator member 220. The actuator member 220 rotates about the pivot 222 when actuator member 220 moves between the locked and unlocked positions.

In some aspects of operation, when the solenoid assembly 229 is energized, the plunger 228 retracts toward the solenoid assembly 229 and pulls the actuator member 220 at pivot 226 to move the actuator member 220 from the locked position to the unlocked position. When the solenoid assembly 229 is de-energized, the plunger 228 translates away from the solenoid assembly 229 and pushes the actuator member 220 toward the locked position.

In the example shown, a sensor plate 224 extends from the actuator member 220 on the opposite side of the pivot 222. The sensor plate 224 includes a surface that interacts with proximity sensors 240 to indicate the position of the actuator member 220. The example proximity sensors 240 can detect the position of the sensor plate 224 and thereby detect whether the actuator member 220 is in the locked or unlocked position. The proximity sensors 240 can produce an electrical signal indicating the position of the actuator member 220. For example, the signal can be sent to an external control system or another destination. In some instances, the proximity sensors 240 can operate independent of the state of the actuation system 230, and the position of the actuator member 220 can still be detected via the proximity sensors 240 even if the actuation system 230 malfunctions. The sensor plate 224 can also act as a mass balance for the actuator member 220. The proximity sensors 240 can detect the position of the sensor plate 224 by mechanical sensors, electrical sensors, optical sensors, or a combination of these and others.

The example pin-capturing member 102 includes an inner surface that defines a slot 150. In the example shown, the upper side of the slot 150 includes a first end wall 207 extending from the slot opening, and an upper sidewall 217 extending from the first end wall 207; the lower side of the slot 150 includes a protruded sidewall 215 that extends from the slot opening to a second end wall 213 at the closed end of the slot. The first end wall 207, the upper sidewall 217, the second end wall 213, and the protruded sidewall 215 meet at curved intersections to define a continuous inner surface of the example slot 150. In some instances, the inner surface can include different angles, materials, intersections, or other features. In the example shown, the distance between the first end wall 207 and the second end wall 213 define the depth of the slot 150; and the distance between the upper sidewall 217 and the protruded sidewall 215 defines a width of the slot 150.

The protruded sidewall 215 shown in FIG. 2A includes a protruded surface that protrudes toward the upper sidewall 217. The protruded portion of inner surface can extend along all or part of the protruded sidewall 215. In some implementations, the protruded sidewall 215 can include a non-protruded region on one or both sides of the protrusion. The protruded surface includes an apex 206, a sloped side 205 between the slot opening and the apex 206, and another sloped side 211 between the apex 206 and the closed end of the slot 150. The sloped side 205 of the protruded sidewall 215 faces toward the first end wall 207 and away from the rotational axis defined by the pivot 104. The other sloped side 211 faces toward the rotational axis defined by the pivot 104. For example, FIG. 2A shows extension lines 201 and 203 that are tangential to the sloped sides 211 and 205, respectively. The extension lines 201 and 203 extend on opposite sides of the pivot 104; the extension line 203 shows that the sloped side 205 faces away from the rotational axis defined by the pivot 104, and the extension line 201 shows that the other sloped side 211 faces toward the rotational axis defined by the pivot 104.

In the example shown, the shape of the protruded sidewall 215 enables the pin 110 to reach the captured position from the released position without having to change direction to disengage the inner surface of the slot 150. For example, as the pin 110 enters the slot 150, it rides along the sloped side 205 toward the apex 206, and releases from the protruded sidewall 215. In the example shown, the sloped side 211 faces the pivot 104, which enables the pin 110 to release from the protruded sidewall 215 while moving toward the pivot 104. The pin 110 may release from the protruded sidewall 215 when it reaches the apex 206, before it reaches the apex 206, or after it reaches the apex 206, depending on the geometry of the slot 150 and other factors. The protruded sidewall 215 can have a variety of shapes. Either or both of the sloped sides 211 and 205 can define a linear incline toward the apex 206, a convex curvature toward the apex 206, a concave curvature toward the apex 206, or a combination of these and other types of shapes. The apex 206 can define an angle, a radius, or another type of intersection between the oppositely sloped sides 211, 205 of the protruded sidewall 215.

FIG. 2A shows the lock assembly 200 in the stowed and locked configuration. As shown in FIG. 2A, the pin-capturing member 102 is at rest in the down position, and the pin 110 is at rest in the captured position within the slot 150. There is a clearance space between the circumference of the pin 110 and the inner surface of the pin-capturing member 102. The torsion spring 216 biases the pin-capturing member 102 against the actuator member 220 in the locked position.

FIG. 2B shows the example lock assembly 200 in an unlocked configuration. As shown in FIG. 2B, the solenoid assembly 229 has moved the actuator member 220 away from the contact surface 242, to the unlocked position. The torsion spring 216 imparts a torque on the pin-capturing member 102 that causes the pin-capturing member 102 to rotate around the pivot 104 toward the up position. The pin-capturing member 102 rotates until the protruded sidewall 215 contacts the pin 110, as shown in FIG. 2B.

FIG. 2C shows the lock assembly 200 in the unlocked configuration as the pin 110 exits the pin-capturing member 102. The actuator member 220 remains in the unlocked position. As shown in FIG. 2C, the transcowl 112 has translated toward the deployed position, which has moved the pin 110 toward the open end of the slot 150. The torsion spring 216 biases the pin-capturing member 102 toward the up position, which causes the pin-capturing member 102 to remain in contact with the pin 110 as the pin 110 translates toward the slot opening. In particular, in the transition from FIG. 2B to FIG. 2C, the pin 110 rides along the sloped side 211 of the protruded sidewall 215 toward the slot opening, to the apex 206.

FIG. 2D shows the example lock assembly 200 as the pin 110 continues exiting the pin-capturing member 102. The actuator member 220 remains in the unlocked position. As shown in FIG. 2D, the transcowl 112 has further translated toward the deployed position, which has moved the pin 110 to the open end of the slot 150. The torsion spring 216 biases the pin-capturing member 102 toward the up position, so the pin-capturing member 102 remains in contact with the pin 110 as the pin 110 translates to the slot opening. In particular, in the transition from FIG. 2C to FIG. 2D, the pin 110 rides along the sloped side 205 of the protruded sidewall 215 from the apex 206 toward the slot opening.

In FIG. 2D, the example pin-capturing member 102 has reached the up position and come to rest against the blocking member 214. If the pin 110 is translated farther toward the released position (e.g., out of contact with the pin-capturing member 102), the pin-capturing member 102 will remain in the up position shown in FIG. 2D.

Figure 3:
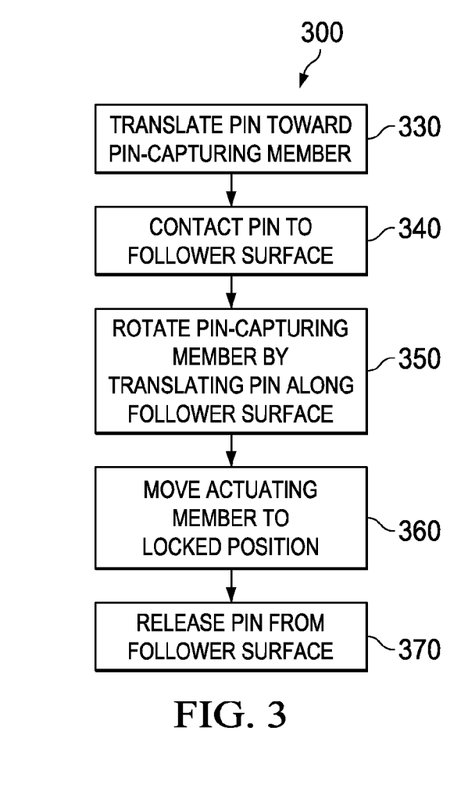
FIG. 3 is a flowchart showing an example aircraft engine thrust reverser relocking process.

From the released position, the pin 110 can be translated back to the captured position, for example, when the transcowl 112 is moved from the deployed configuration to the stowed configuration. FIG. 3 is a flowchart showing an example process 300 for relocking the transcowl 112 from a deployed position to a stowed position. The example process 300 can be implemented by the example lock assembly 100 shown in FIG. 1, the example lock assembly 200 shown in FIGS. 2A-2F, or another type of aircraft engine thrust reverser locking system. For example, FIGS. 2E and 2F show the example lock assembly 200 during two points of the relocking process, and FIG. 2A shows the example lock assembly 200 after the relocking process.

The example process 300 can include the operations shown in FIG. 3, or it may include additional or different operations; and the operations can be performed in the order shown in FIG. 3, or they may be performed in another order. In some instances, one or more of the operations can be iterated or repeated, or multiple operations may be performed in parallel. The process 300 can begin with the lock assembly 200 is in any configuration. In some cases, the process begins by initializing the lock assembly 200, for example, by unlocking the actuator member 220 and rotating the pin-capturing member 102 to the up position. The lock assembly 200 may be initialized in another manner.

At 330, the pin 110 is translated toward the pin-capturing member 102. For example, the pin 110 can be translated toward the pin-capturing member 102 by movement of the transcowl 112 toward the stowed position. The pin 110 can be translated along a linear path generally in the direction of the pivot 104. As the pin 110 is translated, it moves through the open end of the slot 150 into the interior of the pin-capturing member 102.

At 340, the pin 110 contacts the inner surface of the pin-capturing member 102 inside the slot 150. As the pin 110 is translated into contact with the pin-capturing member 102, the pin 110 continues moving closer to the pivot 104. As shown in FIG. 2E, the pin 110 initially contacts the sloped side 205, near the open end of the slot 150. The sloped side 205 acts as a follower surface as the pin 110 rides along the protruded sidewall 215 toward the closed end of the slot 150.

At 350, the pin-capturing member 102 is rotated by translating the pin 110 along the sloped side 205. As the transcowl 112 translates to the stowed position, the pin 110 bears on the sloped side 205, which rotates the pin-capturing member 102 away from the up position toward the down position. As shown in FIG. 2F, translating the pin 110 to the apex 206 rotates the pin-capturing member 102 past the down position due to the shape of the protruded sidewall 215. As the pin 110 is translated along the follower surface within the slot 150, the pin 110 continues moving closer to the pivot 104.

At 360, the actuator member 220 is moved to the locked position. For example, the solenoid assembly 229 can extend the plunger 228 to rotate the actuator member 220 to the locked position. In the locked position, the actuator member 220 can prevent the pin-capturing member 102 from rotating back to the up position. FIG. 2F shows that the actuator member 220 has moved to the locked position.

At 370, the pin 110 releases from the follower surface. For example, when the transcowl 112 translates the pin 110 past the apex 206, the pin 110 can disengage from the interior surface of the pin-capturing member 102. As the pin 110 disengages from the protruded sidewall 215, the pin-capturing member 102 rotates to the position shown in FIG. 2A. To disengage the pin 110 from the pin-capturing member 102, the pin 110 is translated closer to the pivot 104, in the same direction that it was translated at 330, 340, and 350. In other words, the pin 110 need not be translated in another direction to clear the interior surface of the pin-capturing member 102. For example, the pin 110 can arrive in the captured position shown in FIG. 2A without over-stow. In the example shown, because of the angle of the sloped side 211 facing the pivot 104, the pin 110 moves away from the protruded sidewall 215 when the pin 110 is translated closer to the pivot 104 from the apex 206.

When the lock assembly 200 is in the stowed and locked configuration (e.g., as shown in FIG. 2A), the pin-capturing member 102 can prevent the pin 110 from translating to the released position. In the example shown in FIG. 2A, if the transcowl 112 is accidentally deployed, the pin 110 will first impinge the sloped side 211 and ride along the sloped side 211 toward the apex 206. As the pin 110 follows the sloped sidewall, the pin 110 forces the pin-capturing member 102 to rotate out of contact with the actuator member 220, while the actuator member 220 remains in the locked configuration. When the pin 110 has passed over the apex 206, the pin 110 rides along the other sloped side 205, allowing the pin-capturing member 102 to rotate back into contact with the actuator member 220 (e.g., by action of the torsion spring 216). The pin 110 releases from the protruded sidewall and impinges the first end wall 207. In the position shown in FIG. 2A, the first end wall 207 is angled to maintain the pin 110 within the slot 150. As such, the pin-capturing member 102 can prevent the transcowl 112 from inadvertently deploying by preventing the pin 110 from translating to a released position outside the slot 150.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented separately or in any suitable subcombination.

Directional terms may be used to describe the relative locations of components, the relative movement of components, or other related concepts. In this specification, such terms (e.g., "up," "down," "left," "right," "upper," "lower," "top," "bottom," "front," "back," etc.) are used with reference to each other, to describe relative locations or directions in an arbitrary reference frame. Unless otherwise indicated, such terms do not indicate absolute directions or absolute orientations, or any other relationship that is not clearly specified.

A number of embodiments have been described. Nevertheless, it will be understood that various modifications can be made. Accordingly, other embodiments are within the scope of the following claims.

What is claimed is:

1. An aircraft engine thrust reverser lock system comprising:
   a pin-capturing member comprising a body that is rotatable about a rotational axis, the rotational axis being defined by a pivot that extends through the body, the body including:
   an interior surface that defines a slot, the interior surface defining first and second fixed, opposing slot sides between an open end of the slot and a closed end of the slot, an opening between the first and second slot sides at the open end of the slot being sized to receive a pin into the slot;
   the first slot side including:
   an end wall surface that extends from the open end of the slot and faces the rotational axis;
   a first sidewall surface that extends from the end wall surface toward the closed end of the slot; and
   the second slot side including a protruded sidewall surface that protrudes into the slot toward the first sidewall surface and defines an apex between the open and closed ends of the slot, the protruded sidewall surface facing the end wall surface between the apex and the open end of the slot, the protruded sidewall surface facing the rotational axis between the apex and the closed end of the slot, the protruded sidewall surface including a first side that faces the rotational axis and a second side that faces away from the rotational axis, the first and second sides of the protruded sidewall surface defining an acute angle with respect to the apex,
   the protruded sidewall surface configured to cause the body to rotate about the rotational axis in response to the pin passing over the protruded sidewall surface during movement of the pin toward the closed end of the slot, the apex located at a position on the protruded sidewall surface so that the pin comes to rest with clearance between the pin and the interior surface when the pin and pin-capturing member are in a locked configuration.

2. The aircraft engine thrust reverser lock system of claim 1, wherein the end wall surface comprises a first end wall surface, and the interior surface includes a second end wall surface at the closed end of the slot between the first and second slot sides.

3. The aircraft engine thrust reverser lock system of claim 2, wherein the first and second end wall surfaces face each other and define a depth of the slot.

4. The aircraft engine thrust reverser lock system of claim 2, wherein the first end wall surface extends from the opening and meets the first sidewall surface, the first sidewall surface extends from the first end wall surface and meets the second end wall surface, the second end wall surface extends from the first sidewall surface and meets the protruded sidewall surface, and the protruded sidewall surface extends from the second end wall surface to the opening.

5. The aircraft engine thrust reverser lock system of claim 1, wherein the protruded sidewall surface defines a radius at the apex.

6. The aircraft engine thrust reverser lock system of claim 1, the pin-capturing member further comprising a mass balance member extending from the body on an opposite side of the rotational axis.

7. The aircraft engine thrust reverser lock system of claim 1, wherein the body includes an outer surface exterior the slot, the outer surface extending from the first slot side and defining a radiused end of the body, extending from the radiused end to a protrusion that protrudes from the body to engage an actuator member.

8. The aircraft engine thrust reverser lock system of claim 1, further comprising a spring that contacts the body to bias the body toward a first direction of rotation about the rotational axis.

9. An aircraft engine thrust reverser locking system comprising:
   a pin secured to a thrust reverser door assembly and moveable between a captured position and a released position;

a pin-capturing member being rotatable about a pivot between an up position and a down position, the pin-capturing member comprising a body that includes an interior surface that defines a slot and surrounds the pin in the captured position, the interior surface including first and second fixed, opposing slot sides that extend between an open end of the slot and a closed end of the slot, the first slot side including an end wall that faces the pivot and prevents the pin from moving to the released position from inside the slot when the pin-capturing member is in the down position, the second slot side including a protruded surface that defines an apex between the open and closed ends of the slot, the protruded surface including a first portion that faces the pivot between the apex and the closed end of the slot, the protruded surface including a second portion that faces away from the pivot between the apex and the open end of the slot, the first and second portions of the protruded surface defining an acute angle with respect to the apex, the protruded surface configured to cause the body to rotate about the pivot in response to the pin passing over both the protruded surface during movement of the pin from the released position to the captured position, the apex located at a position on the protruded surface so that the pin comes to rest with clearance between the pin and the interior surface when the pin reaches the captured position;

an actuator that is moveable between a locked position and an unlocked position, the actuator in the locked position contacting the pin-capturing member to maintain the pin-capturing member in the down position; and a biasing member that biases the pin-capturing toward the up position.

10. The aircraft engine thrust reverser locking system of claim 9, wherein the pin-capturing member is made of precipitation hardening stainless steel.

11. The aircraft engine thrust reverser locking system of claim 9, wherein the biasing member rotates the pin-capturing member from the down position toward the up position when the actuator is in the unlocked position.

12. The aircraft engine thrust reverser locking system of claim 9, wherein the captured position of the pin corresponds to a stowed configuration of the thrust reverser door assembly, and the released position of the pin corresponds to a deployed configuration of the thrust reverser door assembly.

13. The aircraft engine thrust reverser locking system of claim 9, wherein the biasing member comprises a torsion spring about the pivot.

14. The aircraft engine thrust reverser locking system of claim 9, comprising a sensor plate extending from the actuator.

15. The aircraft engine thrust reverser locking system of claim 14, further comprising one or more proximity sensors operable to detect the position of the sensor plate.

16. The aircraft engine thrust reverser locking system of claim 9, further comprising a blocking member that limits the rotation of the pin-capturing member.

17. The aircraft engine thrust reverser locking system of claim 9, the pin-capturing member further comprising a mass balance member extending from the body on an opposite side of the pivot.

18. The aircraft engine thrust reverser locking system of claim 9, comprising an actuator assembly that includes:
a shaft coupled to the actuator; and
a solenoid operable to translate the shaft to move the actuator between the locked and unlocked positions.

19. An aircraft engine thrust reverser lock, comprising:
a body having an outer boundary, the body including an inner surface defining a slot;
the slot having an entry through the outer boundary, a closed end, and a clearance space, the slot being of fixed dimension; and
the inner surface of the body including a protrusion with two oppositely sloped sides joined at an apex, one of the sloped sides facing toward the entry such that a pin that moves into the slot through the entry rides along the sloped side facing the entry, over the apex, and into the clearance space without contacting the other of the sloped sides, and comes to rest with clearance between the inner surface and the pin when the pin reaches a captured position, the two oppositely sloped sides defining an acute angle with respect to the apex;
the body having a pivot for rotational coupling of the body to a support structure.

\* \* \* \* \*